(12) United States Patent
Dixson

(10) Patent No.: US 11,891,101 B1
(45) Date of Patent: Feb. 6, 2024

(54) MOTORIZED UTILITY CART ASSEMBLY

(71) Applicant: Ryan Dixson, Los Angeles, CA (US)

(72) Inventor: Ryan Dixson, Los Angeles, CA (US)

(*) Notice: Subject to any disclaimer, the term of this patent is extended or adjusted under 35 U.S.C. 154(b) by 0 days.

(21) Appl. No.: 17/992,623

(22) Filed: Nov. 22, 2022

(51) Int. Cl.
*B62B 5/00* (2006.01)

(52) U.S. Cl.
CPC ............ *B62B 5/004* (2013.01); *B62B 5/0053* (2013.01)

(58) Field of Classification Search
CPC ..... B62B 5/004; B62B 5/0043; B62B 5/0046; B62B 5/0053; B62D 51/001; B62D 51/04
See application file for complete search history.

(56) References Cited

U.S. PATENT DOCUMENTS

| | | | | |
|---|---|---|---|---|
| 2,973,823 | A * | 3/1961 | Stentz | B62B 5/0043 180/11 |
| 6,000,486 | A * | 12/1999 | Romick | B62D 51/04 180/209 |
| 6,070,679 | A * | 6/2000 | Berg | B62B 3/1404 280/DIG. 4 |
| 6,244,366 | B1 * | 6/2001 | Otterson | B62D 51/04 180/19.1 |
| 7,210,545 | B1 * | 5/2007 | Waid | B62B 3/12 180/19.1 |
| D546,017 | S | 7/2007 | Wise | |
| 8,371,404 | B2 | 2/2013 | Boeckler | |
| 8,672,081 | B2 * | 3/2014 | Kume | B62B 5/0026 180/19.1 |
| 8,746,377 | B1 * | 6/2014 | Dunbar | B62B 5/0003 280/30 |
| 8,864,149 | B2 * | 10/2014 | Stryker | B62B 3/005 280/47.35 |
| 9,796,402 | B1 * | 10/2017 | Suarez | B62B 5/0053 |
| 10,377,403 | B2 * | 8/2019 | Lee | B60K 17/043 |
| 10,703,401 | B2 * | 7/2020 | Lee | B62B 5/0043 |
| 11,433,934 | B2 * | 9/2022 | Butler | B62B 3/005 |
| 11,618,492 | B2 * | 4/2023 | Sa | B62B 5/06 180/19.3 |
| 11,648,972 | B2 * | 5/2023 | Mallette | B62K 11/10 180/14.1 |
| 2006/0272406 | A1 * | 12/2006 | Murakami | G01L 5/22 73/379.01 |
| 2007/0090702 | A1 * | 4/2007 | Schiller | A45C 15/00 280/655 |
| 2007/0289788 | A1 * | 12/2007 | Salmon | B62D 51/04 180/19.3 |
| 2008/0041644 | A1 | 2/2008 | Tudek | |
| 2008/0128185 | A1 | 6/2008 | Hsich | |

(Continued)

FOREIGN PATENT DOCUMENTS

WO  WO2019059659  3/2019

*Primary Examiner* — Jeffrey J Restifo

(57) ABSTRACT

A motorized utility cart assembly includes a cart that has a bottom platform and a top platform. A drive unit is attached to the bottom platform of the cart and the drive unit includes a pair of drive wheels. Each of the drive wheels is urged to rotate in a first direction when the drive unit is turned on thereby facilitating the cart to travel forwardly to transport cargo on the cart without requiring the user to push the cart. A control unit is integrated into the cart and the control unit is in communication with the drive unit. The control unit includes a throttle which actuates the drive unit to a speed corresponding to a level of engagement of the throttle between a minimum speed and a maximum speed.

7 Claims, 4 Drawing Sheets

(56) References Cited

U.S. PATENT DOCUMENTS

| | | | |
|---|---|---|---|
| 2008/0149406 A1 | 6/2008 | Williams | |
| 2008/0197608 A1 | 8/2008 | Dixon | |
| 2011/0297464 A1 | 12/2011 | Robbins | |
| 2017/0129522 A1* | 5/2017 | Lee | B60K 1/04 |
| 2017/0143571 A1* | 5/2017 | Wilson | B62B 5/04 |
| 2017/0325445 A1* | 11/2017 | Mitchell | A01M 31/006 |
| 2018/0118245 A1* | 5/2018 | Chung | B62B 5/0043 |
| 2018/0244294 A1* | 8/2018 | Ochiai | B62B 5/004 |
| 2019/0092365 A1* | 3/2019 | Lee | B62B 5/06 |
| 2020/0401133 A1* | 12/2020 | Armbrust | G05D 1/0061 |
| 2021/0039701 A1* | 2/2021 | Ifuku | B62B 5/0053 |
| 2021/0146984 A1* | 5/2021 | Baldridge | B62B 3/022 |
| 2021/0213994 A1* | 7/2021 | Sa | B62B 5/0073 |
| 2021/0229724 A1* | 7/2021 | Sa | G01L 5/22 |
| 2021/0284221 A1* | 9/2021 | Perez | B62B 5/0046 |
| 2021/0380153 A1* | 12/2021 | Butler | B62B 5/0046 |
| 2022/0081046 A1* | 3/2022 | Narita | G07C 5/0866 |
| 2022/0161835 A1* | 5/2022 | Venturi | B62B 5/06 |
| 2023/0015530 A1* | 1/2023 | Matsuno | B62B 5/004 |
| 2023/0089693 A1* | 3/2023 | Wang | B62B 5/0053 |
| 2023/0286565 A1* | 9/2023 | Armbrust | B62B 5/0076 |
| | | | 180/167 |
| 2023/0303145 A1* | 9/2023 | Iimura | B62B 5/0073 |
| | | | 180/6.5 |

* cited by examiner (Detail View)

MOTORIZED UTILITY CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to motorized cart devices and more particularly pertains to a new motorized cart device for transporting cargo on a cart without requiring a user to push the cart. The device includes a cart with a top platform, a bottom platform and a drive unit attached to the bottom platform. The device includes a control unit attached to the top platform that includes a throttle in communication with the drive unit. The drive unit urges the cart along a support surface at a speed that corresponds to the degree to which the throttle is engaged. In this way the cart is urged along a support surface for transporting cargo on the cart without requiring the user to push the cart.

(2) Description of Related Art Including Information Disclosed Under 37 CFR 1.97 and 1.98

The prior art relates to motorized cart devices including a three wheeled motorized cart device that includes a cage and a drive unit. The prior art discloses self-propelled cart device that includes a battery powered pool cleaning device that includes a vacuum unit. The prior art discloses a motorized cart device that includes a remote control that is wired to the motorized cart. The prior art discloses a motorized tool cart that includes a plurality of drawers and a drive unit for urging the motorized tool cart along a support surface. The prior art discloses a motorized cart that includes a plurality of storage shelves and a drive unit. The prior art discloses a motorized cart device that includes a first frame hingedly coupled to a second frame and a drive unit integrated into a pair of wheels. The prior art discloses a motorized tool box device that includes a cabinet with a plurality of drawers and a drive unit integrated into the cabinet.

BRIEF SUMMARY OF THE INVENTION

An embodiment of the disclosure meets the needs presented above by generally comprising a cart that has a bottom platform and a top platform. A drive unit is attached to the bottom platform of the cart and the drive unit includes a pair of drive wheels. Each of the drive wheels is urged to rotate in a first direction when the drive unit is turned on thereby facilitating the cart to travel forwardly to transport cargo on the cart without requiring the user to push the cart. A control unit is integrated into the cart and the control unit is in communication with the drive unit. The control unit includes a throttle which actuates the drive unit to a speed corresponding to a level of engagement of the throttle between a minimum speed and a maximum speed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
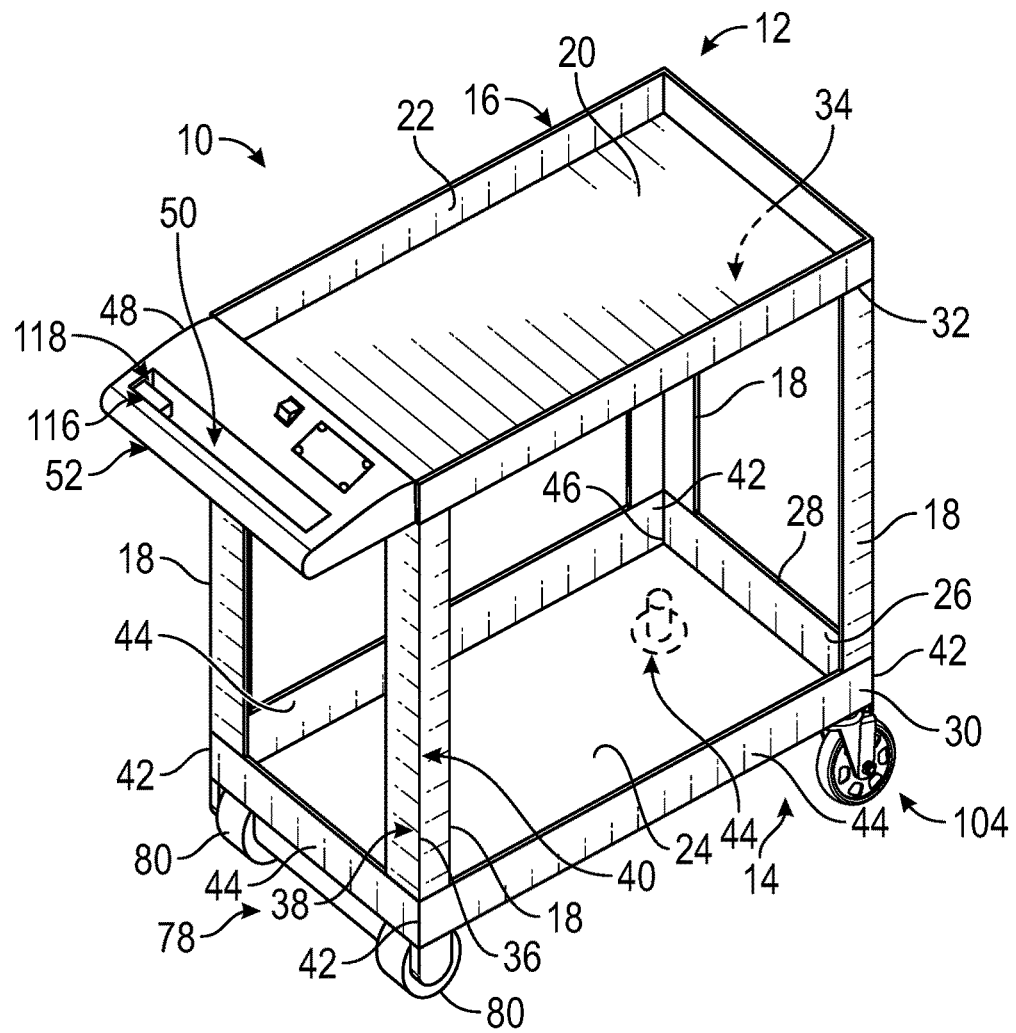
FIG. 1 is a top perspective view of a motorized utility cart assembly according to an embodiment of the disclosure.
Figure 2:
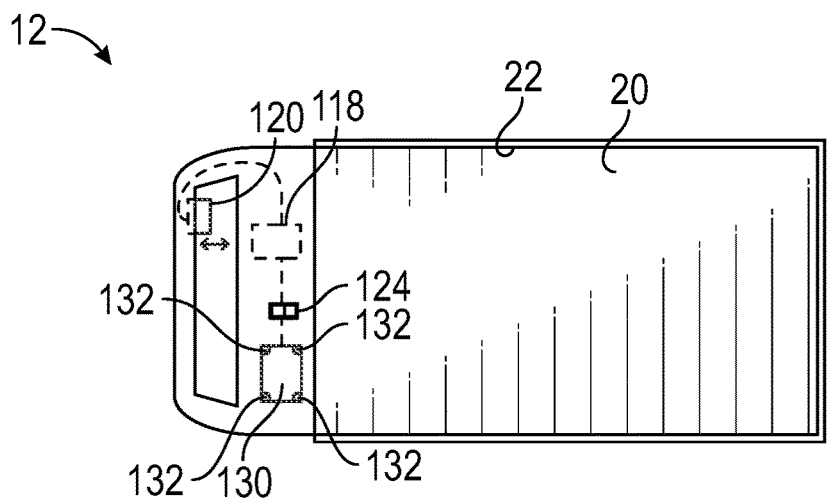
FIG. 2 is a top phantom view of an embodiment of the disclosure.
Figure 3:
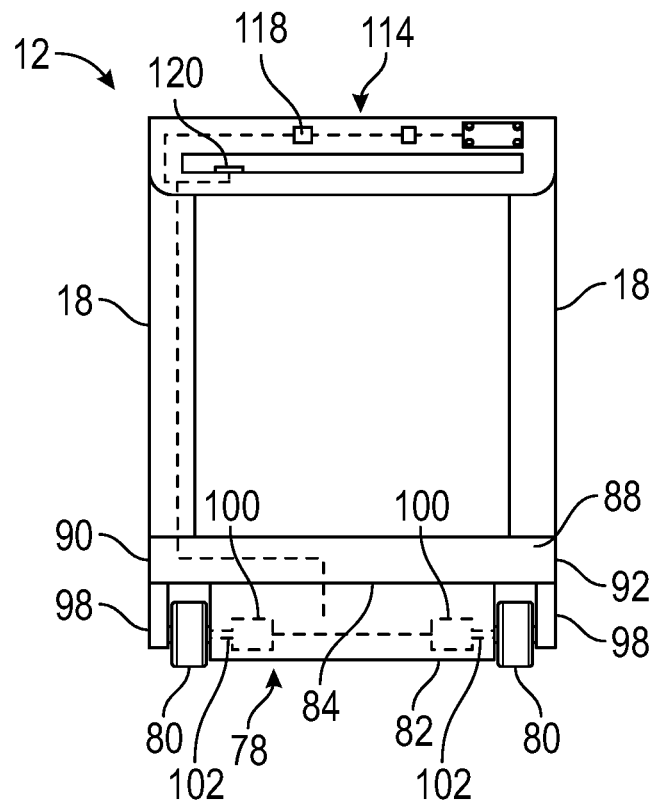
FIG. 3 is a front phantom view of an embodiment of the disclosure.
Figure 4:
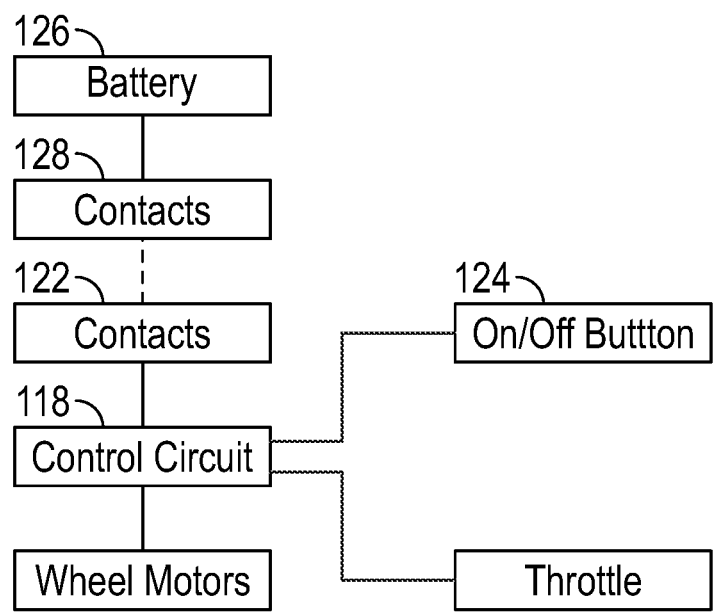
FIG. 4 is a schematic view of an embodiment of the disclosure.
Figure 5:
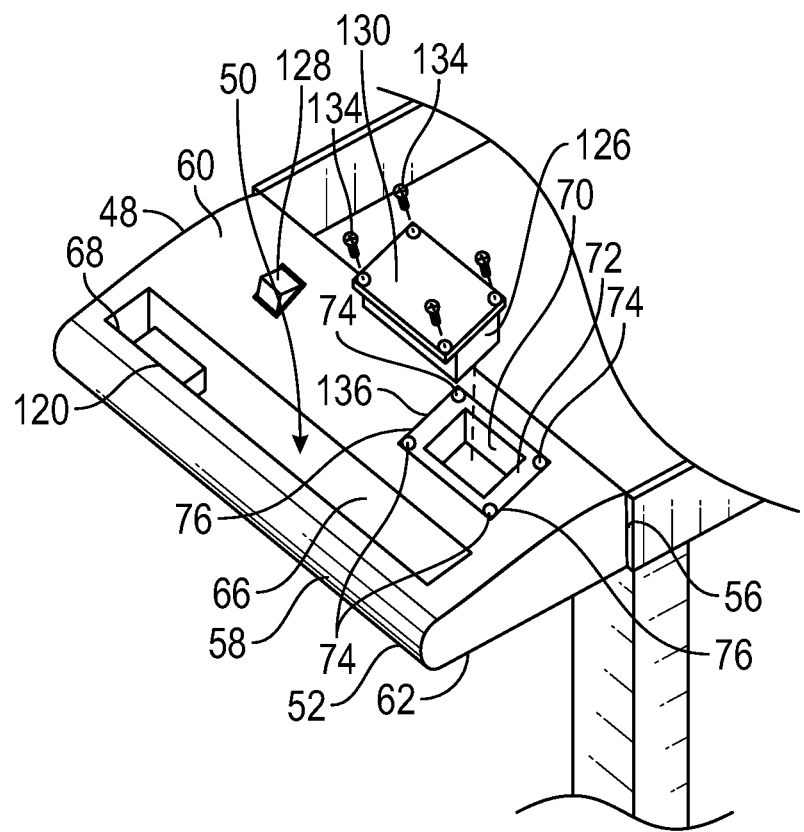
FIG. 5 is a top perspective exploded view of an embodiment of the disclosure.
Figure 6:
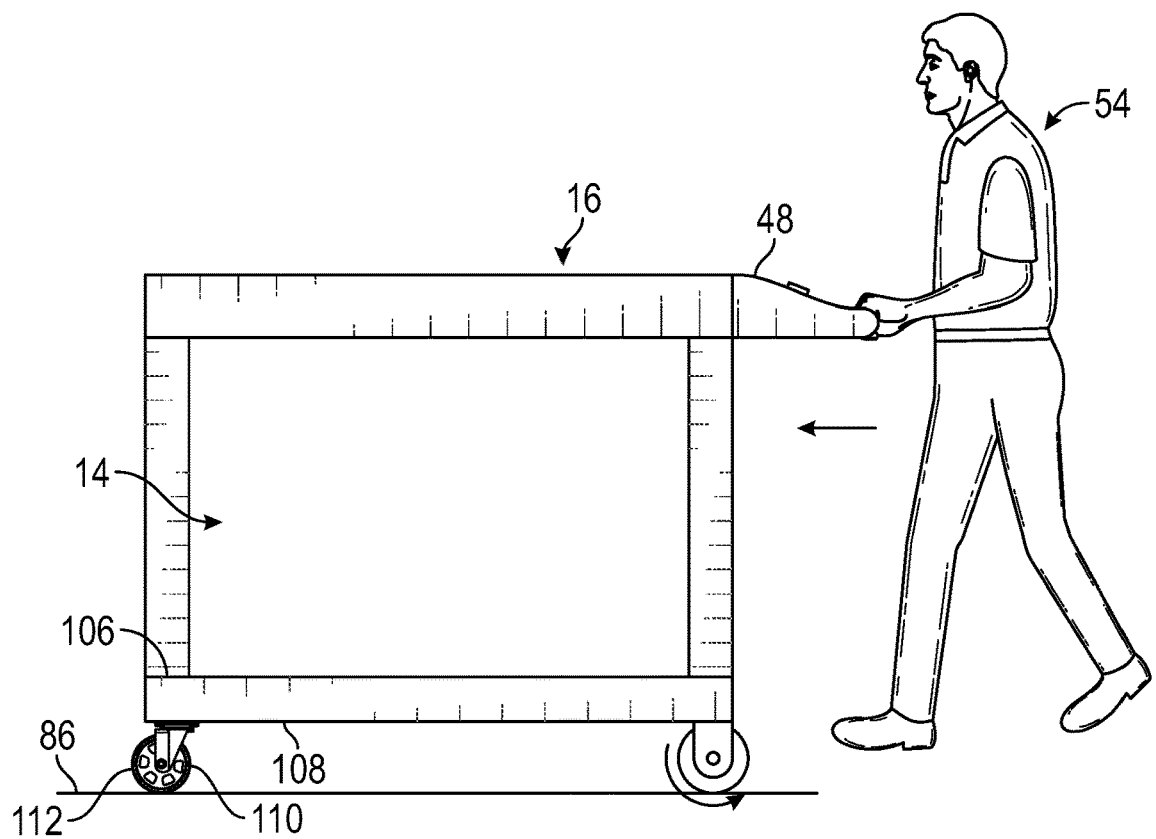
FIG. 6 is a perspective in-use view of an embodiment of the disclosure.
Figure 7:
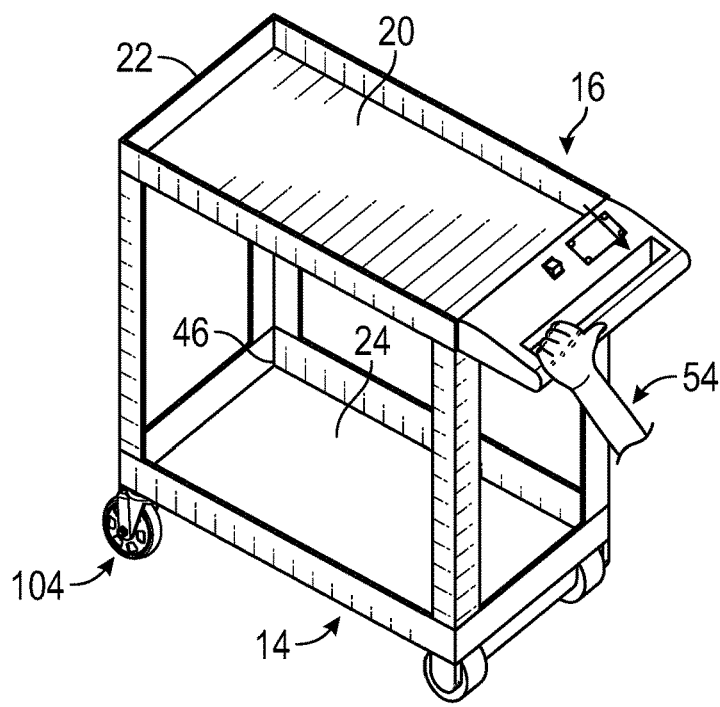
FIG. 7 is a top perspective in-use view of an embodiment of the disclosure.

With reference now to the drawings, and in particular to FIGS. 1 through 7 thereof, a new motorized cart device embodying the principles and concepts of an embodiment of the disclosure and generally designated by the reference numeral 10 will be described.

As best illustrated in FIGS. 1 through 7, the motorized utility cart assembly 10 generally comprises a cart 12 that has a bottom platform 14, a top platform 16 and a plurality of legs 18 extending between the top platform 16 and the bottom platform 14. The top platform 16 has a basal wall 20 and a perimeter wall 22 extending upwardly from the basal wall 20. The bottom platform 14 has a bottom wall 24 and a peripheral wall 26 extending upwardly from the bottom wall 24 and the peripheral wall 26 has a distal edge 28 with respect to the bottom wall 24. Each of the legs 18 has a lower end 30 and an upper end 32; the lower end 30 of each of the legs 18 is coupled to the distal edge 28 of the peripheral wall 26 and the upper end 32 of each of the legs 18 is coupled to a bottom surface 34 of the basal wall 20 of the top platform 16. Each of the legs 18 has a bend 36 extending between the lower end 30 and the upper end 32 to define a first panel 38 that is perpendicularly oriented with a second panel 40. Furthermore, each of the legs 18 is aligned with a respective one of four corners 42 of the peripheral wall 26 of the bottom platform 14 having each of the first panel 38 and the second panel 40 extending along a respective one of four sides 44 of the peripheral wall 26. The upper end 32 of each of the legs 18 is aligned with a respective one of four corners 46 of the bottom wall 24 of the top platform 16.

A grip housing 48 is attached to and extends away from the top platform 16. The grip housing 48 has a slot 50 extending through the grip housing 48 to define a grip 52 on the grip housing 48 such that the grip 52 can be gripped by a user 54. The grip housing 48 has a front wall 56 and a back wall 58 and the grip housing 48 has a top wall 60 and a bottom wall 62 each extending between the front wall 56 and the back wall 58. The top wall 60 slopes downwardly between the front wall 56 and the back wall 58. The back wall 58 is rounded and the front wall 56 is attached to a rear side 64 of the perimeter wall 22 of the top platform 16.

The slot 50 extends through the top wall 60 and the bottom wall 62 of the grip housing 48 and the slot 50 is elongated to extend across a substantial width of the grip housing 48. Additionally, the slot 50 is positioned closer to the back wall 58 than the front wall 56. The slot 50 has a bounding surface 66 and the bounding surface 66 has a rear side 68 that is spaced from and is oriented parallel with the back wall 58 of the grip housing 48. In this way the grip 52 is defined between the rear side 68 of the bounding surface 66 and the back wall 58. The grip housing 48 has a battery well 70 extending through the top wall 60 toward the bottom wall 24. The battery well 70 is positioned between the slot 50 and the front wall 56 and the battery well 70 is offset from a center of the grip housing 48. The top wall 60 has a recess 72 extending toward the bottom wall 24 and the recess 72 surrounds the battery well 70. The top wall 60 has a plurality of fastener wells 74 each extending downwardly toward the bottom wall 24. Each of the fastener wells 74 is positioned in the recess 72 and each of the fastener wells 74 is aligned with a respective one of four corners 76 of the recess 72.

A drive unit 78 is attached to the bottom platform 14 of the cart 12 and the drive unit 78 includes a pair of drive wheels 80 that is each rotatably disposed on the drive unit 78. Each of the drive wheels 80 is urged to rotate in a first direction when the drive unit 78 is turned on thereby facilitating the cart 12 to travel forwardly. In this way the drive unit 78 can transport cargo on the cart 12 without requiring the user 54 to push the cart 12.

The drive unit 78 comprises a drive housing 82 that is coupled to and extends downwardly from a lower surface 84 of the bottom wall 24 of the bottom platform 14 thereby facilitating each of the drive wheels 80 to engage a support surface 86. The drive housing 82 is positioned adjacent to a rear side 88 of the peripheral wall 26 of the bottom platform 14. Additionally, the drive housing 82 is elongated to extend substantially between a first lateral side 90 and a second lateral side 92 of the peripheral wall 26 of the bottom platform 14. Each of the drive wheels 80 is rotatably disposed on a respective one of a first lateral wall 94 and a second lateral wall 96 of the drive housing 82. Each of the drive wheels 80 has a rotational axis extending between the first lateral wall 94 and the second lateral wall 96 of the drive housing 82.

The drive unit 78 includes a pair of supports 98 and each of the supports 98 is coupled to and extends downwardly from the bottom surface 34 of the bottom wall 24 of the top platform 16. Each of the supports 98 is positioned adjacent to a respective one of the drive wheels 80. Furthermore, each of the drive wheels 80 is rotatably attached to a respective one of the supports 98. The drive unit 78 includes a pair of motors 100 that is each positioned within the drive housing 82. Each of the motors 100 has an output shaft 102 that is attached to a respective one of the drive wheels 80. The output shaft 102 associated with each of the drive motors 100 rotates each of the drive wheels 80 in a first direction when the drive motors 100 are turned on for urging the cart 12 to roll along the support surface 86.

A pair of rollers 104 is provided and each of the rollers 104 is rotatably disposed on the bottom platform 14 of the cart 12 thereby facilitating each of the rollers 104 to rotate on the support surface 86. Each of the rollers 104 includes a pivot 106 that is pivotally attached to a bottom surface 108 of the bottom wall 24 of the bottom platform 14. The pivot 106 of each of the rollers 104 is aligned with a respective one of the four corners 42 of the peripheral wall 26 of the bottom platform 14. The pivot 106 of each of the rollers 104 has an arm 110 extending downwardly from the bottom platform 14. Each of the rollers 104 includes a wheel 112 rotatably disposed on the arm 110 of the pivot 106 thereby facilitating the wheel 112 to roll along the support surface 86. The pivot 106 pivots about an axis extending through the bottom wall 24 of the bottom platform 14 thereby facilitating the rollers 104 to steer the cart 12.

A control unit 114 is integrated into the grip housing 48 and the control unit 114 is in communication with the drive unit 78. The control unit 114 includes a throttle 116 that is movably integrated into the grip housing 48. Furthermore, the throttle 116 actuates the drive unit 78 to a speed corresponding to a level of engagement of the throttle 116 between a minimum speed and a maximum speed. The control unit 114 comprises a control circuit 118 that is positioned within the grip housing 48 and the control circuit 118 is electrically coupled to each of the motors 100 in the drive unit 78. A button 120 is movably integrated into the rear side 68 of the bounding surface 66 of the slot 50 in the grip housing 48. The button 120 defines the throttle 116 and the button 120 is electrically coupled to the control circuit 118. The control circuit 118 actuates each of the motors 100 to rotate at a speed ranging between a minimum speed and a maximum speed which corresponds to a degree to which the button 120 is depressed.

A plurality of contacts 122 is each integrated into the battery well 70 and each of the contacts 122 is electrically coupled to the control circuit 118. A power switch 124 is movably integrated into the top wall 60 of the housing and the power switch 124 is electrically coupled to the control circuit 118. The power switch 124 is positionable between an on position and an off position for turning the control circuit 118 on and off. A battery 126 is removably positionable in the battery well 70 in the top wall 60 of the grip housing 48 and the battery 126 has a plurality of contacts 128 integrated into the battery 126. Each of the contacts 122 on the battery 126 is in electrical communication with respective ones of the contacts 128 in the battery well 70 when the battery 126 is positioned in the battery well 70.

Furthermore, each of the contacts 128 in the battery well 70 and each of the contacts 122 on the battery 126 is comprised of an electrically conductive material.

The battery 126 includes a lid 130 that has a plurality of fastener holes 132 each extending through the lid 130. The lid 130 is positioned in the recess 72 in the top wall 60 of the grip housing 48 when the battery 126 is inserted into the battery well 70 having each of the fastener holes 132 being aligned with a respective one of the fastener wells 74. A plurality of fasteners 134 is provided and each of the fasteners 134 is insertable through a respective one of the fastener holes 132 in the lid 130 when the battery 126 is positioned in the battery well 70. Each of the fasteners 134 engages a bounding surface 136 of a respective one of the fastener wells 74 in the top wall 60 of the grip housing 48 for retaining the battery 126 in the battery well 70. Each of the fasteners 134 may comprise a screw or other type of releasable, mechanical fastener.

In use, the user 54 grips the grip 52 on the grip housing 48 and the user 54 depresses the button 120 to actuate the motors 100 in the drive unit 78. In this way the motors 100 rotate the drive wheels 80 to propel the cart 12 along the support surface 86. Thus, the cargo on the cart 12 can be transported without requiring the user 54 to manually push the cart 12. Furthermore, the motors 100 are actuated to rotate a speed ranging between a minimum speed and a maximum speed which correlates to the degree to which the button 120 is depressed. In this way the user 54 is able to control the speed with which the cart 12 transports the cargo.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized utility cart assembly for transporting cargo without requiring effort from a user, said assembly comprising:
 a cart having a bottom platform, a top platform and a plurality of legs extending between said top platform and said bottom platform;
 a grip housing being attached to and extending away from said top platform, said grip housing having a slot extending through said grip housing to define a grip on said grip housing wherein said grip is configured to be gripped by a user;
 a drive unit being attached to said bottom platform of said cart, said drive unit including a pair of drive wheels each being rotatably disposed on said drive unit, each of said drive wheels being urged to rotate in a first direction when said drive unit is turned on thereby facilitating said cart to travel forwardly wherein said drive unit is configured to transport cargo on said cart without requiring the user to push said cart;
 a pair of rollers, each of said rollers being rotatably disposed on said bottom platform of said cart thereby facilitating each of said rollers to rotate on the support surface;
 a control unit being integrated into said grip housing, said control unit being in communication with said drive unit, said control unit including a throttle being movably integrated into said grip housing, said throttle actuating said drive unit to a speed corresponding to a level of engagement of said throttle between a minimum speed and a maximum speed;
 wherein said top platform has a basal wall and a perimeter wall extending upwardly from said basal wall;
 wherein said bottom platform has a bottom wall and a peripheral wall extending upwardly from said bottom wall, said peripheral wall having a distal edge with respect to said bottom wall;
 wherein each of said legs has a lower end and an upper end, said lower end of each of said legs being coupled to said distal edge of said peripheral wall, said upper end of each of said legs being coupled to a bottom surface of said basal wall of said top platform, each of said legs having a bend extending between said lower end and said upper end to define a first panel being perpendicularly oriented with a second panel, each of said legs being aligned with a respective one of four corners of said peripheral wall of said bottom platform having each of said first panel and said second panel extending along a respective one of four sides of said peripheral wall, said upper end of each of said legs being aligned with a respective one of four corners of said bottom wall of said top platform;
 wherein said grip housing has a front wall and a back wall, said grip housing having a top wall and a bottom wall each extending between said front wall and said back wall, said top wall sloping downwardly between said front wall and said back wall, said back wall being rounded, said front wall being attached to a rear side of said perimeter wall of said top platform;
 wherein said slot extends through said top wall and said bottom wall, said slot being elongated to extend across a substantial width of said grip housing, said slot being positioned closer to said back wall than said front wall, said slot having a bounding surface, said bounding surface having a rear side being spaced from and being oriented parallel with said back wall of said grip housing such that said grip is defined between said rear side of said bounding surface and said back wall;
 wherein said grip housing has a battery well extending through said top wall toward said bottom wall, said battery well being positioned between said slot and said front wall, said battery well being offset from a center of said grip housing;
 wherein said top wall has a recess extending toward said bottom wall, said recess surrounding said battery well; and
 wherein said top wall has a plurality of fastener wells each extending downwardly toward said bottom wall, each of said fastener wells being positioned in said recess, each of said fastener wells being aligned with a respective one of four corners of said recess.

2. The assembly according to claim 1, wherein said drive unit comprises a drive housing being coupled to and extending downwardly from a lower surface of said bottom wall of said bottom platform thereby facilitating each of said drive wheels to engage a support surface, said drive housing being positioned adjacent to a rear side of said peripheral wall of said bottom platform, said drive housing being elongated to extend substantially between a first lateral side and a second lateral side of said peripheral wall of said bottom platform, each of said drive wheels being rotatably disposed on a respective one of a first lateral wall and a second lateral wall of said drive housing, each of said drive wheels having a rotational axis extending between said first lateral wall and said second lateral wall of said drive housing.

3. The assembly according to claim 2, wherein said drive unit includes:
- a pair of supports, each of said supports being coupled to and extending downwardly from said lower surface of said bottom wall of said platform, each of said supports being positioned adjacent to a respective one of said drive wheels, each of said drive wheels being rotatably attached to a respective one of said supports; and
- a pair of motors, each of said motors being positioned within said drive housing, each of said motors having an output shaft being attached to a respective one of said drive wheels, said output shaft associated with each of said drive motors rotating each of said drive wheels in a first direction when said drive motors are turned on for urging said cart to roll along the support surface.

4. The assembly according to claim 1, wherein each of said rollers includes a pivot being pivotally attached to said bottom surface of said bottom wall of said bottom platform, said pivot of each of said rollers being aligned with a respective one of said four corners of said peripheral wall of said bottom platform, said pivot of each of said rollers having an arm extending downwardly from said bottom platform, each of said rollers including a wheel being rotatably disposed on said arm of said pivot thereby facilitating said wheel to roll along the support surface, said pivot pivoting about an axis extending through said bottom wall of said bottom platform thereby facilitating said rollers to steer said cart.

5. The assembly according to claim 1, wherein said control unit comprising:
- a control circuit being positioned within said grip housing, said control circuit being electrically coupled to each of said motors in said drive unit;
- a button being movably integrated into said rear side of said bounding surface of said slot in said grip housing, said button defining said throttle, said button being electrically coupled to said control circuit, said control circuit actuating each of said motors to rotate at a speed ranging between a minimum speed and a maximum speed which corresponds to a degree to which said button is depressed;
- a plurality of contacts, each of said contacts being integrated into said battery well, each of said contacts being electrically coupled to said control circuit; and
- a power switch being movably integrated into said top wall of said housing, said power switch being electrically coupled to said control circuit, said power switch being positionable between an on position and an off position for turning said control circuit on and off.

6. The assembly according to claim 5, wherein said control unit includes:
- a battery being removably positionable in said battery well in said top wall of said grip housing, said battery having a plurality of contacts being integrated into said battery, each of said contacts on said battery being in electrical communication with respective ones of said contacts in said battery well when said battery is positioned in said battery well, said battery including a lid having a plurality of fastener holes each extending through said lid, said lid being positioned in said recess in said top wall of said grip housing when said battery is inserted into said battery well having each of said fastener holes being aligned with a respective one of said fastener wells; and
- a plurality of fasteners, each of said fasteners being insertable through a respective one of said fastener holes in said lid when said battery is positioned in said battery well such that each of said fasteners engages a bounding surface of a respective one of said fastener wells in said top wall of said grip housing for retaining said battery in said battery well.

7. A motorized utility cart assembly for transporting cargo without requiring effort from a user, said assembly comprising:
- a cart having a bottom platform, a top platform and a plurality of legs extending between said top platform and said bottom platform, said top platform having a basal wall and a perimeter wall extending upwardly from said basal wall, said bottom platform having a bottom wall and a peripheral wall extending upwardly from said bottom wall, said peripheral wall having a distal edge with respect to said bottom wall, each of said legs having a lower end and an upper end, said lower end of each of said legs being coupled to said distal edge of said peripheral wall, said upper end of each of said legs being coupled to a bottom surface of said basal wall of said top platform, each of said legs having a bend extending between said lower end and said upper end to define a first panel being perpendicularly oriented with a second panel, each of said legs being aligned with a respective one of four corners of said peripheral wall of said bottom platform having each of said first panel and said second panel extending along a respective one of four sides of said peripheral wall, said upper end of each of said legs being aligned with a respective one of four corners of said bottom wall of said top platform;
- a grip housing being attached to and extending away from said top platform, said grip housing having a slot extending through said grip housing to define a grip on said grip housing wherein said grip is configured to be gripped by a user, said grip housing having a front wall and a back wall, said grip housing having a top wall and a bottom wall each extending between said front wall and said back wall, said top wall sloping downwardly between said front wall and said back wall, said back wall being rounded, said front wall being attached to a rear side of said perimeter wall of said top platform, said slot extending through said top wall and said bottom wall, said slot being elongated to extend across a substantial width of said grip housing, said slot being positioned closer to said back wall than said front wall, said slot having a bounding surface, said bounding surface having a rear side being spaced from and being oriented parallel with said back wall of said grip housing such that said grip is defined between said rear side of said bounding surface and said back wall, said grip housing having a battery well extending through said top wall toward said bottom wall, said battery well being positioned between said slot and said front wall, said battery well being offset from a center of said grip housing, said top wall having a recess extending toward said bottom wall, said recess surrounding said battery well, said top wall having a plurality of fastener wells each extending downwardly toward said bottom wall, each of said fastener wells being positioned in said recess, each of said fastener wells being aligned with a respective one of four corners of said recess;

a drive unit being attached to said bottom platform of said cart, said drive unit including a pair of drive wheels each being rotatably disposed on said drive unit, each of said drive wheels being urged to rotate in a first direction when said drive unit is turned on thereby facilitating said cart to travel forwardly wherein said drive unit is configured to transport cargo on said cart without requiring the user to push said cart, said drive unit comprising:

a drive housing being coupled to and extending downwardly from a lower surface of said bottom wall of said bottom platform thereby facilitating each of said drive wheels to engage a support surface, said drive housing being positioned adjacent to a rear side of said peripheral wall of said bottom platform, said drive housing being elongated to extend substantially between a first lateral side and a second lateral side of said peripheral wall of said bottom platform, each of said drive wheels being rotatably disposed on a respective one of a first lateral wall and a second lateral wall of said drive housing, each of said drive wheels having a rotational axis extending between said first lateral wall and said second lateral wall of said drive housing;

a pair of supports, each of said supports being coupled to and extending downwardly from said lower surface of said bottom wall of said platform, each of said supports being positioned adjacent to a respective one of said drive wheels, each of said drive wheels being rotatably attached to a respective one of said supports; and a pair of motors, each of said motors being positioned within said drive housing, each of said motors having an output shaft being attached to a respective one of said drive wheels, said output shaft associated with each of said drive motors rotating each of said drive wheels in a first direction when said drive motors are turned on for urging said cart to roll along the support surface;

a pair of rollers, each of said rollers being rotatably disposed on said bottom platform of said cart thereby facilitating each of said rollers to rotate on the support surface, each of said rollers including a pivot being pivotally attached to said bottom surface of said bottom wall of said bottom platform, said pivot of each of said rollers being aligned with a respective one of said four corners of said peripheral wall of said bottom platform, said pivot of each of said rollers having an arm extending downwardly from said bottom platform, each of said rollers including a wheel being rotatably disposed on said arm of said pivot thereby facilitating said wheel to roll along the support surface, said pivot pivoting about an axis extending through said bottom wall of said bottom platform thereby facilitating said rollers to steer said cart;

a control unit being integrated into said grip housing, said control unit being in communication with said drive unit, said control unit including a throttle being movably integrated into said grip housing, said throttle actuating said drive unit to a speed corresponding to a level of engagement of said throttle between a minimum speed and a maximum speed, said control unit comprising:

a control circuit being positioned within said grip housing, said control circuit being electrically coupled to each of said motors in said drive unit;

a button being movably integrated into said rear side of said bounding surface of said slot in said grip housing, said button defining said throttle, said button being electrically coupled to said control circuit, said control circuit actuating each of said motors to rotate at a speed ranging between a minimum speed and a maximum speed which corresponds to a degree to which said button is depressed;

a plurality of contacts, each of said contacts being integrated into said battery well, each of said contacts being electrically coupled to said control circuit;

a power switch being movably integrated into said top wall of said housing, said power switch being electrically coupled to said control circuit, said power switch being positionable between an on position and an off position for turning said control circuit on and off;

a battery being removably positionable in said battery well in said top wall of said grip housing, said battery having a plurality of contacts being integrated into said battery, each of said contacts on said battery being in electrical communication with respective ones of said contacts in said battery well when said battery is positioned in said battery well, said battery including a lid having a plurality of fastener holes each extending through said lid, said lid being positioned in said recess in said top wall of said grip housing when said battery is inserted into said battery well having each of said fastener holes being aligned with a respective one of said fastener wells; and a plurality of fasteners, each of said fasteners being insertable through a respective one of said fastener holes in said lid when said battery is positioned in said battery well such that each of said fasteners engages a bounding surface of a respective one of said fastener wells in said top wall of said grip housing for retaining said battery in said battery well.

* * * * *